(12) United States Patent
Harmon et al.

(10) Patent No.: US 6,235,339 B1
(45) Date of Patent: May 22, 2001

(54) METHOD OF TREATING A MEAT PROCESSING PLANT WASTE STREAM

(75) Inventors: Bud G. Harmon, Lafayette, IN (US); Stacey L. Barlow, Morris, IL (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/516,291

(22) Filed: Mar. 1, 2000

Related U.S. Application Data

(60) Provisional application No. 60/122,852, filed on Mar. 4, 1999.

(51) Int. Cl.$^7$ .......................................................... A23L 1/31
(52) U.S. Cl. ........................... 426/646; 426/480; 426/481; 426/489; 426/495; 426/805; 426/807; 210/749
(58) Field of Search ..................................... 426/646, 805, 426/807, 480, 481, 489, 495; 210/749

(56) References Cited

U.S. PATENT DOCUMENTS

| | | | |
|---|---|---|---|
| 3,892,640 | * 7/1975 | Furuta | 204/149 |
| 4,144,355 | * 3/1979 | Rawlings et al. | 426/2 |
| 4,182,755 | * 1/1980 | McNeff | 424/147 |
| 4,566,986 | * 1/1986 | Waldmann | 252/175 |
| 4,761,239 | * 8/1988 | Wardell | 210/727 |
| 4,888,053 | * 12/1989 | Arayson et al. | 75/101 R |
| 5,204,007 | 4/1993 | Mosley et al. | 210/705 |
| 5,451,326 | 9/1995 | Carlson et al. | 210/708 |
| 5,543,056 | * 8/1996 | Murcott et al. | 210/705 |
| 5,614,102 | * 3/1997 | Sakurada | 210/718 |
| 6,123,854 | * 9/2000 | Iwane et al. | 210/716 |

* cited by examiner

Primary Examiner—Chhaya D. Sayala
(74) Attorney, Agent, or Firm—Woodard, Emhardt, Naughton, Moriarty & McNett

(57) ABSTRACT

A method of treating an organic waste stream, such as the waste from a meat processing plant, to substantially remove solid organic matter from the stream. The method substitutes $MgCl_2$ and small amounts of $AlCl_3$ for the $FeCl_3$ that was used in the prior art process, before adding polymeric flocculents. The polymeric flocculents are added as they are in the prior art, and the solid precipitate is removed by physical separation.

8 Claims, No Drawings

METHOD OF TREATING A MEAT PROCESSING PLANT WASTE STREAM

This application claims benefit to Provisional Application 60/122,852 filed Mar. 4, 1999.

FIELD OF THE INVENTION

The present invention relates generally to methods of treating organic waste streams, and more particularly to a method of treating the waste stream of an animal processing plant to recycle the fat, blood, tissue and other organic solids typically found in the stream.

BACKGROUND OF THE INVENTION

It is well known that meat-processing plants generate significant amounts of solid organic waste material daily, and that the waste from such plants can be difficult and expensive to treat. Meat processing plant waste streams typically contain blood, fat, muscle, bone, and intestinal contents, mixed into many gallons of wash-down water. Thus, the waste effluent may potentially contaminate water supplies if not properly treated, and the amount of organic matter lost through that treatment may be large.

For economic as well as environmental reasons then, many meat-processing facilities strive to reclaim solid organic material from the processing stream. As indicated above, the removal of organic waste is critical from an environmental standpoint, and in fact both federal and municipal governments typically place tight restrictions on the total dissolved solids, chemical oxygen demand (COD), biological oxygen demand (BOD) and total organic carbon (TOC) of water discharged into local sewers, rivers, or municipal wastewater treatment plants.

To comply with these standards, waste material is typically treated with industrial strength $FeCl_3$ followed by the addition of cationic or anionic polymers to induce flocculation and facilitate subsequent solids removal. This process generally occurs at a low pH of about 6.

While the above process is generally effective to decontaminate the water, the removed solids have not been shown to have any independent commercial value. In particular, the removed solids have not been accepted as an animal feed ingredient due to the fact that many animals refuse to eat feeds containing significant amounts of $FeCl_3$. Consequently, the removed organic solids are typically transported to and deposited in a landfill. Not only does this entail significant transportation and dumping costs, but this practice results in the continued buildup of already overcrowded landfills.

A need therefore exists for a process that removes organic material from waste streams while simultaneously creating a product with independent commercial value. The present invention addresses that need.

SUMMARY OF THE INVENTION

Briefly describing one aspect of the present invention, there is provided a method of treating an organic waste stream to substantially remove solid organic matter from the stream. The preferred method comprises substituting $MgCl_2$ (and sometimes a small amount of $AlCl_3$) for the $FeCl_3$ that previously has been added to a processing plant waste stream, and adjusting the pH to at least about 7.0. Polymeric flocculents are then added as they were in the prior art, and the solid precipitate is removed by centrifugation.

The removed organic matter finds utility as an animal feedstuff, thus minimizing waste disposal problems while simultaneously generating a product with commercial value.

One object of the present invention is to provide a method of treating a waste stream that avoids the addition of large amounts of $FeCl_3$.

A further object is to provide a method that reduces the BOD level of the clarified liquid to less than 800 ppm.

Further objects and advantages of the present invention will be apparent from the following description.

DESCRIPTION OF THE PREFERRED EMBODIMENT

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

As briefly described above, the present invention provides a method for removing organic mater from a waste product stream. The waste stream can contain plant or animal matter. Most typically, the waste stream contains organic animal matter such as blood, fine bone, muscle, etc, from a food-animal packing plant. As will be appreciated by persons skilled in the art however, other organic waste streams may be treated by the present invention.

The effluent from a meat packing plant typically contains organic animal matter in concentrations of 0.3% to 3% (or even more), with concentration of about 1% being most common. The present method is applicable throughout this entire concentration range, with the amounts of the various components being adjusted according to the particular waste stream involved. It is appreciated that it is difficult to determine and/or control the concentration or makeup of solids in a plant effluent stream, and those skilled in the art recognize that fluctuations are normal. The following method and amounts may be altered to account for fluctuations from the typical range.

In one aspect of the present invention two salts are used to replace (in whole or in substantial part) the $FeCl_3$ used in the prior art. The first of those salts is a soluble magnesium salt, which is dissolved in the organic waste stream. The Mg salt is provided in an amount effective to induce flocculation of organic material when used in conjunction with the other materials. Preferably the magnesium salt is $MgCl_2$.

In the preferred embodiments between 1 L and 10 L of technical grade $MgCl_2$ (approximately 32% $MgCl_2$ solution) per 1000 L of effluent is added to the aqueous waste stream. Between 2.0 and 4.0 L per 1000 L of effluent is even more preferred, although no adverse effects other than economic waste result from the addition of larger amounts of magnesium compound. In other preferred embodiments $MgCl_2$ is added to provide between about 0.5–5.0% $MgCl_2$ by volume of waste material, with 0.75% to 1.5% $MgCl_2$ being more preferred.

In some embodiments combinations of waste stream components flocculation is enhanced when a small amount of minute quantities of a soluble aluminum-based compound (preferably an aluminum salt) is dissolved into the effluent in addition to the $MgCl_2$. Many aluminum salts can be used, with $AlCl_3$, alum, aluminum chlorohydrate, sulfonated PAC (aluminum chloride and acrylamide), and aluminum sulfate being most effective in testing to date. $AlCl_3$ is most preferred.

As with the magnesium compound, the aluminum salt is provided in an amount effective to induce flocculation in conjunction with $MgCl_2$ and polymer addition. Generally, an effective amount is between about 0.05% and about 0.25% aluminum salt (w/v). When a 50% solution is used, about 0.1 L to about 0.5 L per 1000 L of effluent is preferred, although as with the $MgCl_2$, somewhat greater amounts may be required for a particular waste stream.

The addition of the aluminum salt may lower the pH of the solution to 6.0 or less, but it is preferable to elevate the pH to above 7.0. More preferably the pH should be about 8.0, with a pH of between about 9 and about 10 being preferred with certain waste streams. Any base may be used to elevate the pH, with NaOH working quite effectively in testing to date. Typically, approximately 0.5–2 L of NaOH (50% solution caustic soda) is needed per 1000 L of effluent, with the specific amount varying with the organic waste stream being treated. As is known to the art, the pH should be monitored to ensure the appropriate level. In certain preferred embodiments the pH is kept slightly below 9 to avoid damaging equipment used in the process.

The solution thus made is preferably agitated to induce complete mixing of the salts with the waste stream. Any type of mixing apparatus may be used, as is known to the art.

To the foregoing solution is added a polymeric flocculent in an amount effective to flocculate the solid organic matter in the stream. Many commercially available polymers are effective as flocculents, as is known to the art. It is to be appreciated that when the recovered organic material is used for animal feedstuff, toxic polymers should be avoided.

Particularly useful in the present method are cationic acrylamide copolymer salts. In particular Salfloc 4700 available from SAL Chemical Co., Inc., Weirton W.Va. is preferably used. For a typical effluent stream, 2–3 ml of a 1% solution of Salfloc 4700 is preferably added per 250 ml of effluent.

In another embodiment a copolymer of acrylamide and sodium acrylate may be used. For example Salfloc 6950 available from SAL Chemical Co., Inc., Weirton W.Va. is preferably added and has proved the most effective. A typical amount is preferably about 2–3 ml of a 1% solution, per 250 ml of typical effluent.

In a further embodiment, the aluminum compound added is sulfonated PAC which comprises aluminum chloride and acrylamide. Depending on the effluent and the amount added, the acrylamide in the sulfonated PAC may complete flocculation avoiding the need for further polymer addition.

To most effectively induce flocculation, the sequential addition of the magnesium salt, followed by the aluminum salt when added, and finally the polymer is preferred. Furthermore, while the pH may be continually monitored and maintained at the preferred level, it is to be appreciated that the addition of the aluminum salt typically lowers the pH necessitating the addition of base to raise the pH to above 7.0 before the polymer is added. However, one skilled in the art may vary the process steps as conditions warrant, and in particular upon conversion to a continuous process. As noted above, it may be possible to combine several steps, as with the use of PAC to provide both the aluminum salt and the polymeric flocculent.

Following flocculation, the organic matter precipitate is removed from the solution. In industrial applications the flocculated material may be floated by the addition of air bubbles and then skimmed off the top in dissolved air floatation (DAF) equipment. Other methods of removing the flocculated material may be used, as is appreciated by persons skilled in the art.

Upon flocculation of the majority of the organic matter, the supernatant liquid typically contains about 800 ppm BOD or less, depending on the characteristics of the original material and the extent of flocculation and removal. Total dissolved solids are typically reduced to below about 60 mg per 100 ml of effluent, with total dissolved solids being reduced to about 30 mg per 100 ml of effluent in many cases.

Further clarification or purification of the liquid following solid separation may be necessary if any color or residual material remains in the fluid fraction. Accordingly, in another embodiment of the invention, such further clarification is preferably accomplished by adding an effective amount of an oxidizing agent to further reduce the BOD and COD levels to meet environmental standards. In particular, sodium hypochlorite or hydrogen peroxide are effective for this subsequent clarification, and should be added in amounts effective to eliminate residual color and bring organic contaminate levels to acceptable environmental levels. Typically, 5.25% sodium hypochlorite or 3.0% hydrogen peroxide is added at the rate of about 0.05–0.2% by volume of supernatant. Standard water quality tests may then be used to measure environmental compliance.

In industry use, it may be preferable to pass the flocculated material through a DAF or Sharples types centrifuge, or both, to isolate the organic matter from the clarified liquid. The liquid may then, for example, be pumped to municipal waste treatment plants.

Primarily because the present method avoids the addition of large amounts of $FeCl_3$, the flocculated material, including the removed organic matter, may subsequently be put to economical use. Particular applications will depend on, for instance, the protein content or nutritional value of the retained flocculated product.

In one application, the retained product has high nutritional value and increased palatability and/or decreased toxicity when $FeCl_3$ use is avoided, thereby making the retained product compatible with use as an animal feed ingredient. Tests have shown that organic matter removed from a waste stream by the present method has high digestibility when incorporated into swine diets.

Reference will now be made to specific examples using the processes described above. It is to be understood that the examples are provided to more completely describe preferred embodiments, and that no limitation to the scope of the invention is intended thereby. The examples indicate preferred materials and amounts for removing organic material from an effluent stream wherein the removed material is compatible with use as an animal feed ingredient.

EXAMPLES 1–7

Typical waste effluent from a meat packing plant was poured into laboratory flasks and stirred at medium pace. This material had an organic concentration of between 0.1% and 0.8%. The chart below indicates the volume of the flask, the initial pH as well as the amounts of $MgCl_2$, a 32% solution as well as the amount and type of aluminum compound and the amount of NaOH followed by the addition of 2–3 ml per 250 ml of 1% solution of Salfloc 6950 available from Sal Chemical Company in Weirton, W.Va. The solution was stirred for approximately 15–20 seconds immediately prior to the polymer addition. In each case, flocculation occurred upon addition of the polymer, and after allowing the solid material to settle for approximately 10–30 seconds, the fluid fraction was tested and found to have BOD less than about 500 ppm.

| Vol | Initial PH | Solution Added | pH | Solution Added | PH | Solution Added | pH | Solution Added | PH |
|---|---|---|---|---|---|---|---|---|---|
| 250 | 6.78 | 15 drops $MgCl_2$ | 6.77 | 5 drops $AlCl_3$ | 6.05 | 10 drops NaOH | 9.72 | 6950 poly | 9.72 |
| 250 | 7.24 | 15 drops $MgCl_2$ | 7.18 | 5 drops $AlCl_3$ | 6.16 | 10 drops NaOH | 9.76 | 6950 poly | 9.76 |
| 250 | 7.16 | 15 drops $MgCl_2$ | 7.06 | 7 drops AQ 120 | 5.98 | 10 drops NaOH | 9.34 | 6950 poly | 9.34 |
| 250 | 7.15 | 15 drops $MgCl_2$ | 7.10 | 7 drops AQ 100 | 6.51 | 10 drops NaOH | 10.18 | 6950 poly | 10.18 |
| 150 | 7.22 | 9 drops $MgCl_2$ | 7.17 | 4 drops AQ 100 | 6.48 | 6 drops NaOH | 8.62 | 6950 poly | 8.62 |
| 150 | 7.05 | 9 drops $MgCl_2$ | 7.02 | 4 drops AQ 119 | 6.38 | 6 drops NaOH | 9.99 | 6950 poly | 9.99 |
| 200 | 7.83 | 15 drops $MgCl_2$ | 7.41 | 6 drops $AlCl_3$ | 5.93 | 10 drops NaOH | 9.80 | 6950 poly | 9.80 |

Notes:
AQ 100 Aluminum Chlorhydrate, available from Aqua Mark Inc.
AQ 119 Sulfonated PAC, available from Aqua Mark Inc.
AQ 120 Alum (Aluminum Sulfate), available from Aqua Mark Inc.

EXAMPLE 8

For some initial concentrations and compositions of waste material as well as for variations of the amount or type of treating chemicals as illustrated in Examples 1–7, addition of a flocculating polymer did not fully reduce the COD or CBOD to acceptable levels. Additionally, in some cases residual color remained in the fluid fraction. In these cases, the fluid fraction was subsequently removed and placed in a separate laboratory beaker under mild agitation. Sodium hypochlorite (5.25%) was added at 0.05–0.2% by volume. Alternatively, hydrogen peroxide (3.0%) was added at 0.05–0.2% by volume. In either case, the solution was stirred for 10–20 seconds before tested to determine water COD and CBOD and compliance with standards for water quality. The addition of sodium hypochlorite or hydrogen peroxide was found to remove residual color and bring the water into compliance with water quality standards.

EXAMPLE 9

The process in example 1–7 was scaled up and used in the packing plant from which the samples had been obtained while the plant operated at 500 to 600 gallons per minute. The process was allowed to operate for three, separate, one-half day periods. During tests, the quantities of each additive were varied to determine optimum concentrations for those given days. In the large DAF, the optimum pH was less basic than had been observed in bench top tests. In the scale up at the packing plant, the effluent discharged from the plant had BOD just over 700 and total dissolved solids of 33 mg per 100 ml. The separated flocculated material was centrifuged to approximately 25% dry matter (DM).

The precipitated organic solids, 25% DM, was processed (cooked and dried) in a rendering plant to produce a feed ingredient valuable as a protein supplement for food producing animals (swine, poultry, and cattle). The product has been incorporated into swine diets which supported growth comparable to the inclusion of a standard meat and bone meal feed ingredient.

While the invention has been illustrated and described in detail in the foregoing description using meat packing plant material, the same is to be considered as illustrative and not restrictive in character, it being understood that only the preferred embodiments have been shown and described, and that all changes and modifications that come within the spirit of the invention are desired to be protected for use in food processing of plant origin as well.

What is claimed is:

1. In a process for treating an organic waste stream from a food processing plant by the addition of a metal chloride and flocculation polymers to produce a flocculent that can be separated from the waste stream, the improvement comprising using a magnesium compound and an aluminum compound instead of $FeCl_3$ as the metal chloride, wherein the magnesium compound and the aluminum compound are each added in an amount effective to induce flocculation and reduce the BOD of the supernatant liquid to less than about 700 ppm when used in combination with a flocculating polymer at a pH of greater than 7.0.

2. The improvement of claim 1 and further comprising elevating the pH of said stream to at least about 8.0 before adding the flocculation polymer.

3. The method of claim 1 wherein the organic solution comprises the waste stream from a meat processing plant.

4. A method of removing organic matter from a waste product containing solid organic matter, said method comprising:
   providing a solution of said organic matter;
   adding to said solution of organic matter a solution of $MgCl_2$ in an amount effective to provide between about 0.5% and about 5.0% $MgCl_2$ by volume of waste material;
   adding to said solution of organic matter and $MgCl_2$ a solution of $AlCl_3$ in an amount of at least about 0.05% (w/v);
   raising the pH to about 8.5;
   adding a polymeric flocculent to flocculent and precipitate the organic matter from said solution; and
   isolating the precipitated organic solids;
   wherein the use of $FeCl_3$ to remove organic matter is substantially avoided.

5. The method of claim 4 further comprising reducing the BOD of the resulting liquid to less than about 750 ppm.

6. The method of claim 4 and further comprising cooking and drying the isolated organic solids and producing an animal feed ingredient from the processed isolated organic solids.

7. The method of claim 4 wherein said solution of $MgCl_2$ is added in an amount effective to provide between about 0.75% and about 1.5% $MgCl_2$ by volume of waste material.

8. The method of claim 4 wherein said solution of $AlCl_3$ is added in an amount of between about 0.5% and about 0.25% (w/v).

* * * * *